United States Patent [19]

Sloan, Sr.

[11] 4,091,955

[45] May 30, 1978

[54] PLASTIC FILLER NECK CAP

[75] Inventor: Paul H. Sloan, Sr., Nottawa, Mich.

[73] Assignee: Stant Manufacturing Company, Inc., Connersville, Ind.

[21] Appl. No.: 799,995

[22] Filed: May 24, 1977

[51] Int. Cl.² .............................................. B65D 51/16
[52] U.S. Cl. ................................... 220/203; 220/200; 220/319; 220/288
[58] Field of Search ............... 220/202, 319, 200, 203, 220/204, 205, 206, 207, 208, 209, 210, 288

[56] References Cited

U.S. PATENT DOCUMENTS

| 3,331,528 | 7/1967 | Racek | 220/319 |
|---|---|---|---|
| 3,815,776 | 6/1974 | MacMillan | 220/209 |
| 3,843,015 | 10/1974 | Blau et al. | 220/200 |
| 3,907,155 | 9/1975 | Smith et al. | 220/209 |
| 3,985,260 | 10/1976 | Evans | 220/203 |
| 4,000,632 | 1/1977 | Summan | 220/210 |
| 4,000,633 | 1/1977 | Evans | 220/210 |

FOREIGN PATENT DOCUMENTS

| 2,340,319 | 8/1973 | Germany | 220/203 |

*Primary Examiner*—William Price
*Assistant Examiner*—Joseph M. Moy

*Attorney, Agent, or Firm*—Jenkins, Coffey & Hyland

[57] ABSTRACT

A molded plastic fuel tank filler neck cap includes a closure portion having an axially inner end for engaging and closing the filler neck, and an axially outer end. The cap further includes a shell providing a hand-grip cover, the shell and the closure axially outer end being rotatably fastened together by a retainer ring. The shell includes a depending radially outer annular skirt having a radially extending flange adjacent its axially inner edge. The flange provides a peripheral, axially outwardly facing surface. The ring includes a radially outer, axially extending portion which provides an axially inwardly facing surface for engaging the axially outwardly facing surface of the flange. The axially inwardly facing surface extends interruptedly peripherally about the ring to provide engaging segments and clearance segments. The ring includes a plurality of radially and peripherally extending slots which are axially spaced from the interrupted axially inwardly facing surface. Each slot is peripherally aligned with an engaging segment of the interrupted axially inwardly facing surface. The clearance segments lie peripherally between the slots. The ring thus can be formed in a two-part mold with no complex mold movement.

9 Claims, 5 Drawing Figures

PLASTIC FILLER NECK CAP

This invention relates to caps for filler necks, and more particularly to a molded plastic cap for a vehicle fuel filler neck.

There are several well-known types of fuel tank filler neck caps which are constructed partly from plastic materials. Caps of this type are illustrated in, for example, U.S. Pat. No. 4,000,632 issued Jan. 4, 1977 to Summan; U.S. Pat. No. 3,985,260 issued Oct. 12, 1976 to Evans; and, U.S. Pat. No. 3,831,801 issued Oct. 27, 1974 to Rodgers. These patents all disclose vehicle fuel tank filler neck caps having threaded neck end closure portions made of molded plastic, and formed metal outer shell portions crimped to retain the closure portions, the shell portions providing hand grips for installation and removal of the caps from the fuel tank filler necks.

The apparatus of the instant invention constitutes an improvement over such prior art devices, in that the inventive apparatus provides a cap for a fuel tank filler neck in which the outer shell portion, as well as the threaded closure portion is molded from plastic compositions. Another feature of the apparatus of the instant invention is that it provides a snap-together assembly of molded plastic components including the closure member, the shell and a snap-on ring for joining and retaining the closure member to the shell. Such a snap-together assembly is less expensive to mold and to assemble than prior art assemblies which require crimping of metal parts. In the illustrated embodiment of the invention, the ring is of a simple construction which does not require complex mold apparatus to achieve the desirable, inexpensive snap-together cap construction. The ring in the illustrated embodiment is formed in a two-part mold.

According to the present invention, the fuel cap comprises a closure having an axially outer portion and an axially inner portion for engaging and closing the fuel filler neck. The shell of the fuel cap provides a grip cover for the outer portion. The ring rotatably fastens the shell and the closure together. The shell includes means providing a peripherally extending, axially outwardly facing surface and the ring includes means providing a peripherally extending, axially inwardly facing surface for engaging the axially outwardly facing surface of the shell and capturing the closure and shell rotatably together. At least one of the axially facing surfaces is interrupted to provide peripherally spaced-apart engaging segments and clearance segments, and at least one of the shell and ring is provided with a plurality of peripherally and radially extending slots axially spaced from its axially facing interrupted surface, each slot being peripherally aligned with one of the engaging segments.

According to the illustrated embodiment of the present invention, the peripherally extending, axially outwardly facing surface is provided on a radially outwardly extending flange on an axially inwardly directed skirt extending about the periphery of the shell. The peripherally extending, axially inwardly facing surface is provided on a radially inwardly extending flange supported on a radially outer, axially outwardly extending portion of the ring.

Further according to the present invention, the ring includes a second axially outwardly extending portion radially inwardly from the first axially outwardly extending portion. This second axially outwardly extending portion provides, at its axially outer extent, a surface for supporting the closure in the shell when the ring is snapped into place on the shell with the shell axially outwardly facing surface and the ring axially inwardly facing surface in engagement. The ring includes a web portion which joins the first and second axially outwardly extending portions together. The radially and peripherally extending slots are defined by the web portion. The clearance segments are provided on the ring peripherally between the slots.

The invention may best be understood by referring to the following description and accompanying drawings which illustrate the invention. In the drawings.

Figure 2:
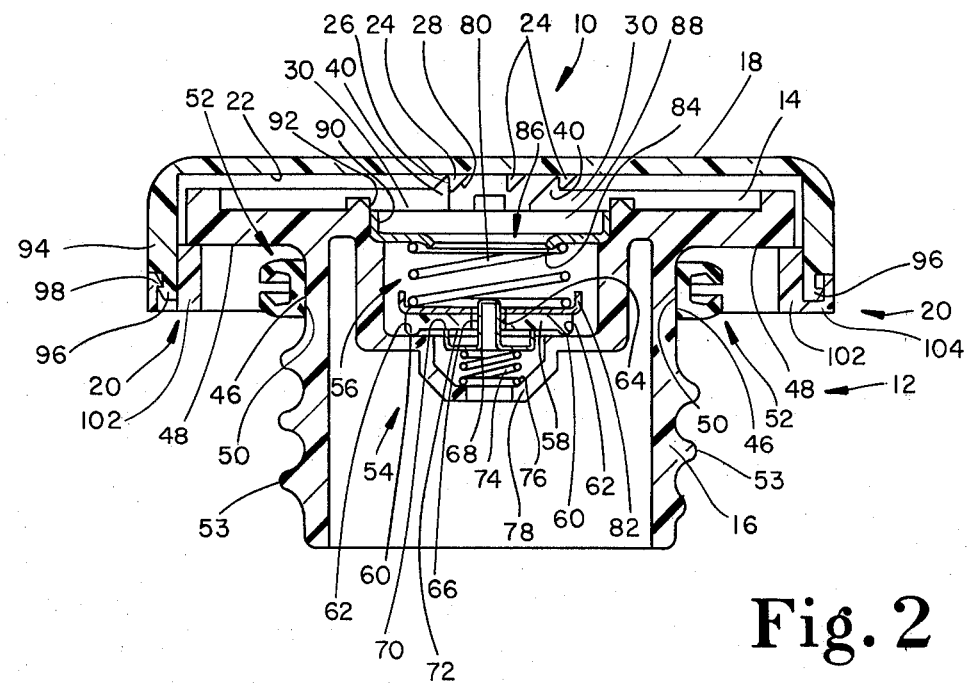
FIG. 2 is a vertical sectional view of the cap of FIG. 1 taken generally along section lines 2—2 thereof.
Figure 1:
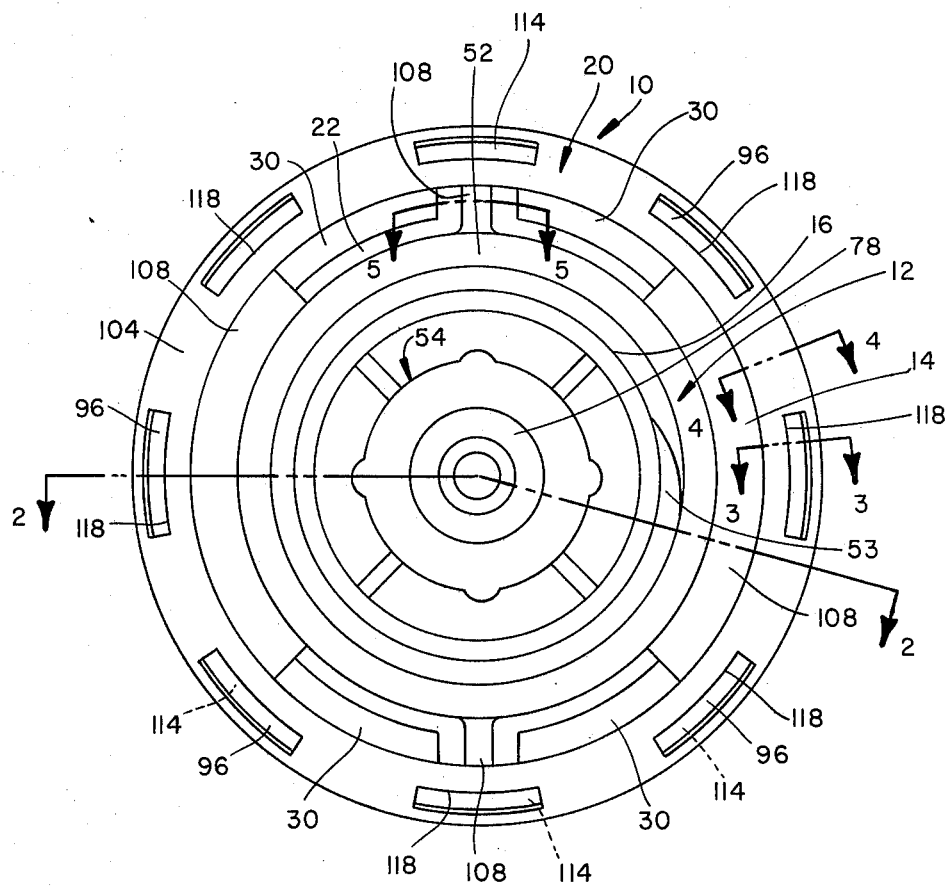
FIG. 1 is a bottom plan view of the molded plastic fuel tank filler neck cap of the instant invention.

Referring to the drawings, and particularly to FIGS. 1-2, the fuel tank filler neck cap 10 of the instant invention includes a closure 12 having an axially outer portion 14 and an axially inner portion 16. Cap 10 also includes a shell 18 providing a hand grip for outer portion 14, and a ring 20 for rotatably fastening shell 18 and closure 12 together.

Figure 5:
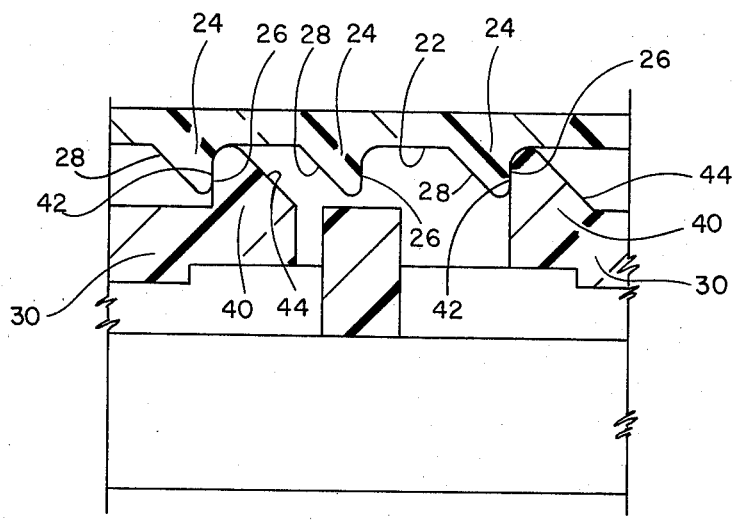

Referring particularly to FIGS. 1 and 5, the axially inwardly facing surface 22 of shell 18 is provided with a set of circularly disposed ratchet teeth 24, each of which has a peripherally facing engaging surface 26 and a peripherally and axially inwardly facing camming surface 28.

The axially outer portion 14 of closure 12 includes four pawl fingers 30. Fingers 30 are molded as integral parts of closure 12, from a resilient plastic compositions. Fingers 30 are molded to urge axially outwardly into engagement with ratchet teeth 24 in the assembled cap 10. Fingers 30 are provided with pawl teeth 40 which include peripherally extending engaging surfaces 42 and peripherally and axially outwardly extending camming surfaces 44. Teeth 24 on shell 18 and teeth 40 on fingers 30 cooperate to provide a direct driving connection between closure 12 and shell 18 in a direction to remove cap 10 from the fuel tank filler neck (not shown), and a torque-overriding connection in the direction to advance cap 10 onto the fuel tank filler neck. The overriding torque is determined by the flexibility of molded plastic fingers 30 and the inclination of camming surfaces 28 and 44. The amount of torque required to override the engagement of surfaces 28, 44 of teeth 24, 40, respectively, can be varied by varying the flexibility of the material from which closure 12 is molded and the camming structure of fingers 30 and teeth 24.

An annular O-ring seating groove 46 is provided on the axially inner portion 16 of closure 12, directly inwardly from the axially inner surface 48 of axially outer portion 14. Groove 46 faces radially outwardly to receive the radially inner surface 50 of an O-ring 52. O-ring 52 is provided to seal cap 10 to the lip provided at the axially outer end of the vehicle fuel tank filler neck (not shown). A principal consideration in determining the desirable overriding torque between closure 12 and shell 18 is O-ring 52. The overriding torque must be so determined to prevent excessive compression of O-ring 52 against the fuel tank filler neck lip, thereby preventing damage to O-ring 52 and impairing its ability to seal the vehicle fuel tank when cap 10 is in place. The particular construction of O-ring 52 is discussed in the co-pending U.S. Pat. application of Paul H. Sloan, Jr. Ser. No. 706,051, filed July 16, 1976 titled O-RING and assigned to the same assignee as the present invention, and also described in the co-pending continuation-in-part application Ser. No. 798,981, filed May 24, 1977 of the same Paul H. Sloan, Jr., titled O-RING, filed of even date herewith, and assigned to the same assignee as the present invention. These above-identified patent applications describe the structure and function of O-ring 52. Thus, it is not necessary here to discuss the details of it. Screw-threads 53 are provided on the radially outer surface of axially inner portion 16. Threads 53 engage similar threads in the fuel tank filler neck (not shown).

Referring now to FIG. 2, closure 12 also includes a pressure-vacuum vent valve housing 54 which houses a pressure-vacuum vent valve assembly 56. Assembly 56 controls the venting of fuel vapors at a predetermined superatmospheric pressure out of the fuel tank through housing 54 and between closure 12 and shell 18 to atmosphere. Assembly 56 also controls the venting of air through housing 54 into the fuel tank when the pressure in the tank decreases to a predetermined sub-atmospheric level. Briefly, assembly 56 includes a pressure-venting disc 58 including an annular, axially inwardly facing valve edge 60 which seats against an axially outwardly facing valve seat 62 provided by housing 54. Disc 58 includes a central circular aperture 64. An inverted cup-shaped guiding stem portion 66 of a vacuum-venting valve member 68 is received in aperture 64, holding valve member 68 in alignment in assembly 56. Valve member 68 includes an annular, axially outwardly facing valve edge 70 which cooperates with a seat region 72 on the axially inner surface of pressure venting disc 58. Valve edge 70 is held against seat 72 by a vacuum-venting control spring 74 disposed between the axially inwardly facing surface of valve member 68 and the bottom 76 of a spring retainer cup 78 provided at the axially inner end of housing 54. Valve edge 60 of pressure venting disc 58 is held against seat 62 by a pressure-venting control spring 80. Spring 80 is held in place between a spring retainer cup 82 which rests on the axially outwardly facing surface of disc 58 and the axially inturned edge 84 of an aperture 87 in the center of a pressurevacuum vent valve assembly retainer disc 88. Disc 88 includes an axially outwardly extending skirt 90 which is press-fitted into a central opening 92 at the axially outer end of housing 54.

Figure 4:
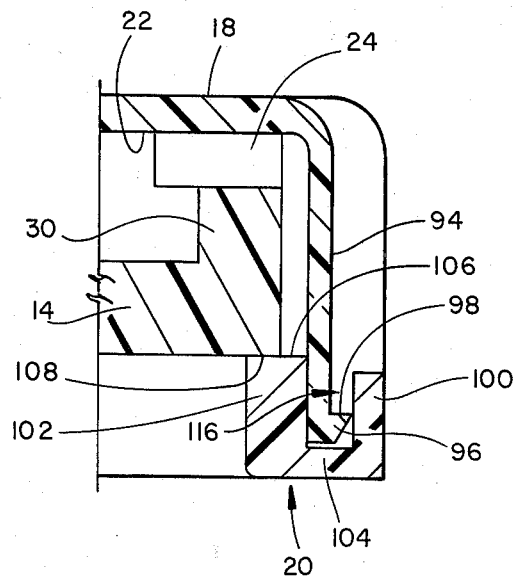
FIG. 4 is an enlarged fragmentary sectional view of the cap of FIGS. 1-2 taken along section lines 4—4 of FIG. 1; and, FIG. 5 is an enlarged fragmentary sectional view of the cap of FIGS. 1-2 taken along section lines 5—5 of FIG. 1.
Figure 3:
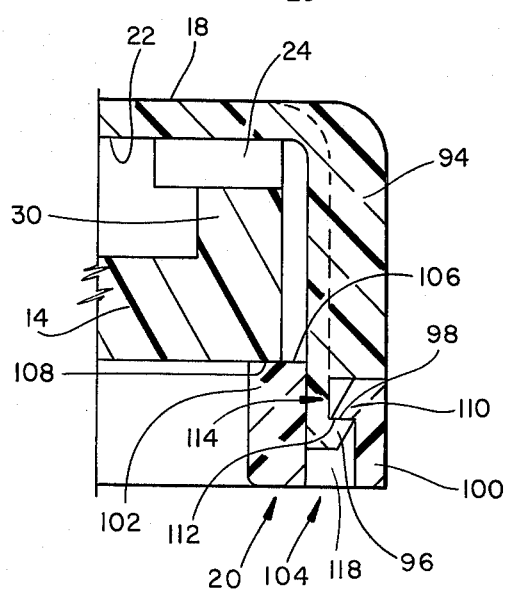
FIG. 3 is an enlarged fragmentary sectional view of the cap of FIGS. 1-2 taken along section lines 3—3 of FIG. 1.

Shell 18 includes a peripherally and axially inwardly extending skirt 94. As best illustrated in FIGS. 3-4, a radially outwardly extending flange 96 is provided adjacent the axially inner end of skirt 94. Flange 96 provides a peripherally extending, axially outwardly facing surface 98.

Retainer ring 20 includes a radially outer, axially outwardly extending portion 100 and a radially inner, axially outwardly extending portion 102 joined by an axially inner, radially and peripherally extending web portion 104. Portion 102 is provided at its axially outer extent with a surface 106 for supporting closure 12 with pawl teeth 40 engaging ratchet teeth 24 on surface 22 of shell 18. Surface 48 of closure portion 14 is provided with axially inwardly facing, peripherally and radially extending land areas 108 surrounding fingers 30. Land areas 108 rest against surface 106.

A radially inwardly extending flange 110 extends about the interior periphery of the radially outer, axially outwardly extending portion 100 of ring 12. Flange 110 includes a peripherally extending, axially inwardly facing surface 112 which is interrupted to provide peripherally spaced-apart engaging segments 114 and clearance segments 116. Web portion 104 defines a plurality of peripherally and radially extending slots 118 spaced axially from engaging segments 114 and peripherally aligned with engaging segments 114. Clearance segments 116 are provided peripherally between slots 118. The location of engaging segments 114 axially outwardly from, and peripherally aligned with, slots 118 and the clearance segments 116 between slots 118 allows ring 20 to be made in a simple split mold. The absence of flange 110 in the clearance segments 116 and the presence of slots 118 axially directly beneath the portions of flange 110 that provide engaging segments 114 means that there are no "overhanging" or "interfering" structures in ring 20. The absence of such structures avoids the necessity for any complex motion by any part of the mold apparatus used to mold ring 20. The two parts of the split mold used to make ring 20 can be pulled apart linearly to remove a finished ring 20.

It should be understood that with slight modification from the illustrated embodiment, flange 96 can extend radially inwardly from skirt 94 of shell 18, and flange 110 can extend radially outwardly from some portion of ring 20. In such situation, slots similar to slots 118 could be provided peripherally about the axially outer end of shell 18 to render shell 18 capable of production in a simple, split mold. It will be appreciated that in such a situation, ring 20 could still be made in a simple split mold, thereby further decreasing the manufacturing cost per cap.

What is claimed is:

1. In a fuel cap comprising a closure having an axially outer portion and an axially inner portion for engaging and closing a fuel filler neck, and a shell providing a grip cover for said outer portion and a ring for rotatably fastening the shell and closure together, the improvement wherein the shell includes means providing a peripherally extending, axially outwardly facing surface and the ring includes means providing a peripherally extending, axially inwardly facing surface for engaging the axially outwardly facing surface of the shell and capturing the closure and shell rotatably together, at least one of the axially facing surfaces being interrupted to provide peripherally spacedapart engaging segments and clearance segments, and at least one of the shell and ring being provided with a plurality of peripherally and radially extending slots axially spaced from its axially facing interrupted surface, each slot being peripherally aligned with one of said engaging segments.

2. The apparatus of claim 1 wherein the peripherally extending, axially outwardly facing surface is provided on an axially inwardly extending skirt extending about the periphery of the shell.

3. The apparatus of claim 2 wherein the peripherally extending, axially outwardly facing surface is provided on a radially outwardly extending flange on the skirt.

4. The apparatus of claim 1 wherein the peripherally extending, axially inwardly facing surface is provided on a radially outer, axially outwardly extending portion of the ring.

5. The apparatus of claim 4 wherein the peripherally extending, axially inwardly facing surface is provided on a radially extending flange on the axially outwardly extending portion of the ring.

6. The apparatus of claim 5 wherein the radially extending flange on the axially outwardly extending portion of the ring is a radially inwardly extending flange.

7. The apparatus of claim 6 wherein the ring further includes a second axially outwardly extending portion radially inwardly from the first axially outwardly extending portion, the second axially outwardly extending portion provided at its axially outer extent with a surface for supporting the closure in the shell when the ring is snapped into place on the shell with the shell axially outwardly facing surface and the ring axially inwardly facing surface in engagement.

8. The apparatus of claim 7 wherein the ring further comprises a web portion for joining the first and second axially outwardly extending portions, the web portion extending radially and defining the radially and peripherally extending slots, the clearance segments being provided on the ring being provided between the slots.

9. A cap for a vehicle fuel tank filler neck comprising a shell member including means defining a hand grip, a closure member including means for closing the end of the filler neck, the shell including an axially inwardly projecting skirt having a radially extending flange, the flange including a peripheral, axially outwardly facing surface, and the closure member having a radially extending supporting portion about at least a portion of the periphery thereof, and a ring member for rotatably locking the closure member to the shell member, the ring member including means for contacting the supporting portion of the closure member and means providing and axially inwardly facing surface for engaging the flange axially outwardly facing surface, one of the axially inwardly and axially outwardly facing surfaces extending interruptedly peripherally about its respective cap member to provide engaging segments and clearance segments, and at least one of the ring and shell members defining a plurality of radially and peripherally extending slots axially spaced from the interrupted axially facing surface, each slot being peripherally aligned with a clearance segment of the interrupted axially facing surface.

* * * * *

UNITED STATES PATENT OFFICE
CERTIFICATE OF CORRECTION

Patent No. 4,091,955          Dated May 30, 1978

Inventor(s)   Paul H. Sloan, Sr.

It is certified that error appears in the above-identified patent and that said Letters Patent are hereby corrected as shown below:

Column 3, line 51, "aperture 87" should be -- aperture 86 --; same column, line 52, "pressurevacuum" should be -- pressure-vacuum --.

Column 4, line 7, "ring 12" should be -- ring 20 --; same column, line 54 "spacedapart" should be -- spaced-apart --.

Column 6, line 13, "and" should be -- an --; same column, line 22, "with a" should be -- between adjacent --; same line, "segment" should be -- segments --.

Signed and Sealed this

Twenty-third Day of January 1979

[SEAL]

*Attest:*

RUTH C. MASON
*Attesting Officer*

DONALD W. BANNER
*Commissioner of Patents and Trademarks*